(12) United States Patent
Kim et al.

(10) Patent No.: US 12,195,091 B2
(45) Date of Patent: Jan. 14, 2025

(54) VEHICLE BODY STRUCTURE

(71) Applicants: Hyundai Motor Company, Seoul (KR); Kia Corporation, Seoul (KR)

(72) Inventors: Keon Woo Kim, Hwaseong-si (KR); Sang Woo Kim, Seongnam-si (KR); Seung Won Lee, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 293 days.

(21) Appl. No.: 17/929,095

(22) Filed: Sep. 1, 2022

(65) Prior Publication Data

US 2023/0303183 A1   Sep. 28, 2023

(30) Foreign Application Priority Data

Mar. 25, 2022   (KR) .................. 10-2022-0037590

(51) Int. Cl.
| | |
|---|---|
| *B62D 25/08* | (2006.01) |
| *B62D 21/15* | (2006.01) |
| *B62D 25/04* | (2006.01) |
| *B62D 25/06* | (2006.01) |
| *B62D 25/14* | (2006.01) |
| *B62D 27/02* | (2006.01) |

(52) U.S. Cl.
CPC ............. *B62D 25/08* (2013.01); *B62D 21/15* (2013.01); *B62D 25/04* (2013.01); *B62D 25/06* (2013.01); *B62D 25/081* (2013.01); *B62D 25/145* (2013.01); *B62D 27/023* (2013.01)

(58) Field of Classification Search
CPC ........ B62D 25/06; B62D 25/04; B62D 25/08; B62D 25/14; B62D 25/00; B62D 17/02; B62D 17/023; B62D 17/065; B62D 21/15; B62D 21/157; B62D 27/02; B62D 27/023; B62D 27/065
USPC .... 296/193.06, 192, 193.02, 203, 1, 203.03, 296/29, 30, 210
See application file for complete search history.

(56) References Cited

U.S. PATENT DOCUMENTS

| | | | | |
|---|---|---|---|---|
| 7,407,220 B1 * | 8/2008 | Kanagawa | ........... | B62D 25/082 296/203.02 |
| 8,690,230 B2 * | 4/2014 | Suzaki | ................. | B62D 25/145 296/192 |
| 11,097,329 B2 * | 8/2021 | Viaux | .................... | B62D 65/02 |
| 11,198,351 B2 * | 12/2021 | Matsumura | ............ | B62D 25/02 |

* cited by examiner

*Primary Examiner* — Dennis H Pedder
(74) *Attorney, Agent, or Firm* — Slater Matsil, LLP

(57) ABSTRACT

In accordance with an embodiment, a vehicle body structure includes: a roof side rail; a front pillar connected to the roof side rail; a cowl member connected to the front pillar, and extending in a width direction of a vehicle; a cowl cross bar located below the cowl member, connected to the front pillar, and extending in the width direction of the vehicle; and a connection bracket connecting the front pillar, the cowl member, and the cowl cross bar.

20 Claims, 10 Drawing Sheets

VEHICLE BODY STRUCTURE

CROSS-REFERENCE TO RELATED APPLICATIONS

This application claims the benefit of priority to Korean Patent Application No. 10-2022-0037590, filed on Mar. 25, 2022, which application is hereby incorporated herein by reference.

TECHNICAL FIELD

The present disclosure relates to a vehicle body structure.

BACKGROUND

A vehicle includes a roof structure covering the top of a passenger compartment. The roof structure includes a pair of roof side rails spaced apart from each other in a width direction of the vehicle, a plurality of roof crossmembers connecting the pair of roof side rails, and a roof panel supported by the pair of roof side rails and the plurality of roof crossmembers.

In the event of a frontal collision, a vehicle front structure may be deformed before impact energy is transferred to occupants, thereby appropriately absorbing the impact energy. However, in the event of a vehicle rollover accident, the impact energy may push the roof panel and be directly transferred to the passenger compartment, thereby causing fatal injury to the occupants. In order to safely protect the occupants from the vehicle rollover accident, it is necessary to ensure sufficient roof strength of the vehicle. In order to achieve the sufficient roof strength of the vehicle, it is necessary to transfer the impact energy applied to the roof structure to various parts (front pillars, rear pillars, etc.) of the vehicle when the vehicle rollover accident occurs.

Meanwhile, as a cross-sectional area of the front pillar connected to the front of the roof side rail increases, strength of the front pillar may relatively increase. Accordingly, the impact energy applied to the roof structure may be stably transferred to the front pillar, and thus the roof strength of the vehicle may be achieved.

In order to sufficiently achieve the strength of the front pillar and the roof strength within the limited cross-sectional area of the front pillar, a plurality of reinforcements may be partially attached to the front pillar. However, as the overall weight of the vehicle increases, the cross-sectional area of the front pillar may relatively increase. Accordingly, forward visibility of the vehicle may be relatively reduced. In addition, as the plurality of reinforcements are attached to the front pillar in order to achieve the strength of the front pillar within the limited cross-sectional area of the front pillar, the weight and cost of the front pillar may increase.

The above information described in this background section is provided to assist in understanding the background of the inventive concept, and may include any technical concept which is not considered as the prior art that is already known to those skilled in the art.

SUMMARY

An aspect of the present disclosure provides a vehicle body structure significantly improving strength and stiffness of a vehicle body by distributing and transferring a load applied to a portion (e.g., a roof) of the vehicle body in various directions.

According to an aspect of the present disclosure, a vehicle body structure may include: a roof side rail; a front pillar connected to the roof side rail; a cowl member connected to the front pillar, and extending in a width direction of a vehicle; a cowl cross bar located below the cowl member, connected to the front pillar, and extending in the width direction of the vehicle; and a connection bracket connecting the front pillar, the cowl member, and the cowl cross bar.

As the connection bracket connects the front pillar, the cowl member, and the cowl cross bar, a load may be transferred from the front pillar to the cowl member and the cowl cross bar, and accordingly the load may be significantly reduced or may be prevented from being concentrated on the front pillar.

The connection bracket may be fixed to an inboard-side surface of the front pillar, and the cowl member and the cowl cross bar may be directly connected to the connection bracket.

As the connection bracket is fixed to the inboard-side surface of the front pillar, the cowl member and the cowl cross bar may be directly connected to the connection bracket so that connection stiffness of the cowl member, the cowl cross bar, and the front pillar may be improved.

The connection bracket may include a mounting wall fixed to the inboard-side surface of the front pillar, a rear flange fixed to an end portion of the cowl member, and a bottom flange fixed to an end portion of the cowl cross bar.

The connection bracket may be fixed to the inboard-side surface of the front pillar, the end portion of the cowl member, and the end portion of the cowl cross bar through the mounting wall, the rear flange, and the bottom flange, respectively, so that connection stiffness of the front pillar, the cowl member, and the cowl cross bar may be improved.

The mounting wall may be provided on a front portion of the connection bracket, and the mounting wall may be fixed to the inboard-side surface of the front pillar through a fastener.

As the mounting wall is fixed to the inboard-side surface of the front pillar, the connection bracket may be firmly supported to the front pillar.

The rear flange may be provided on a rear portion of the connection bracket, and the rear flange may be fixed to the end portion of the cowl member through a fastener.

The rear flange may be fixed to the end portion of the cowl member through the fastener, thereby achieving connection stiffness between the connection bracket and the cowl member.

The bottom flange may be provided on a bottom end portion of the connection bracket, and the bottom flange may be fixed to the end portion of the cowl cross bar through a fastener.

The bottom flange may be fixed to the end portion of the cowl cross bar through the fastener, thereby achieving connection stiffness between the connection bracket and the cowl cross bar.

The vehicle body structure may further include a roof side reinforcement extending from the roof side rail to an inner cavity of the front pillar, and an end portion of the roof side reinforcement may be connected to the front pillar, the cowl member, and the cowl cross bar through the connection bracket.

As the end portion of the roof side reinforcement is connected to the front pillar, the cowl member, and the cowl cross bar through the connection bracket, a load applied to the roof side reinforcement may be distributed and transferred to the front pillar, the cowl member, and the cowl cross bar.

The connection bracket may further include a top flange connected to the end portion of the roof side reinforcement, and a portion of the front pillar may be sandwiched between the top flange and the roof side reinforcement.

The top flange of the connection bracket may be mounted on the front pillar and the roof side reinforcement in a manner that allows the portion of the front pillar to be sandwiched between the top flange and the roof side reinforcement, and thus stiffness of the front pillar and connection stiffness between the roof side reinforcement and the connection bracket may be improved.

The top flange may be provided on a top end portion of the connection bracket, and the top flange may be fixed to the front pillar and the roof side reinforcement through a fastener.

The top flange may be fixed to the front pillar and the roof side reinforcement through the fastener, thereby achieving connection stiffness between the connection bracket and the roof side reinforcement.

According to an aspect of the present disclosure, a vehicle body structure may include: a roof side rail; a front pillar connected to the roof side rail; a fender apron member extending from the front pillar toward the front of a vehicle; and an extension bracket received in an inner cavity of the front pillar, and connecting the front pillar and the fender apron member.

As the extension bracket connects the front pillar and the fender apron member, a load may be transferred from the front pillar to the fender apron member, and accordingly the load may be significantly reduced or may be prevented from being concentrated on the front pillar.

The vehicle body structure may further include a roof side reinforcement extending from the roof side rail to the inner cavity of the front pillar. An end portion of the roof side reinforcement may be located in the inner cavity of the front pillar, and the end portion of the roof side reinforcement may be connected to the fender apron member through the extension bracket.

As the end portion of the roof side reinforcement is connected to the fender apron member through the extension bracket, a load applied to the roof side reinforcement and the front pillar may be distributed and transferred to the fender apron member.

The vehicle body structure may further include a support received in the inner cavity of the front pillar, and fixed to the front pillar. The support may be located below the extension bracket, the support may be directly connected to the fender apron member, and the extension bracket may be fixed to the support.

The extension bracket may include an inboard wall facing the interior of the vehicle, a front wall facing the front of the vehicle, a rear wall facing the rear of the vehicle, and a rear extension wall extending from the rear wall toward the rear of the vehicle.

The inboard wall may have a bottom flange provided on a bottom end thereof, and the bottom flange may be fixed to the support.

The front wall may have a bottom flange provided on a bottom end thereof, and the bottom flange may be fixed to the support.

The rear wall may have a bottom flange provided on a bottom end thereof, and the bottom flange may be fixed to the support.

The rear extension wall may support the end portion of the roof side reinforcement.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
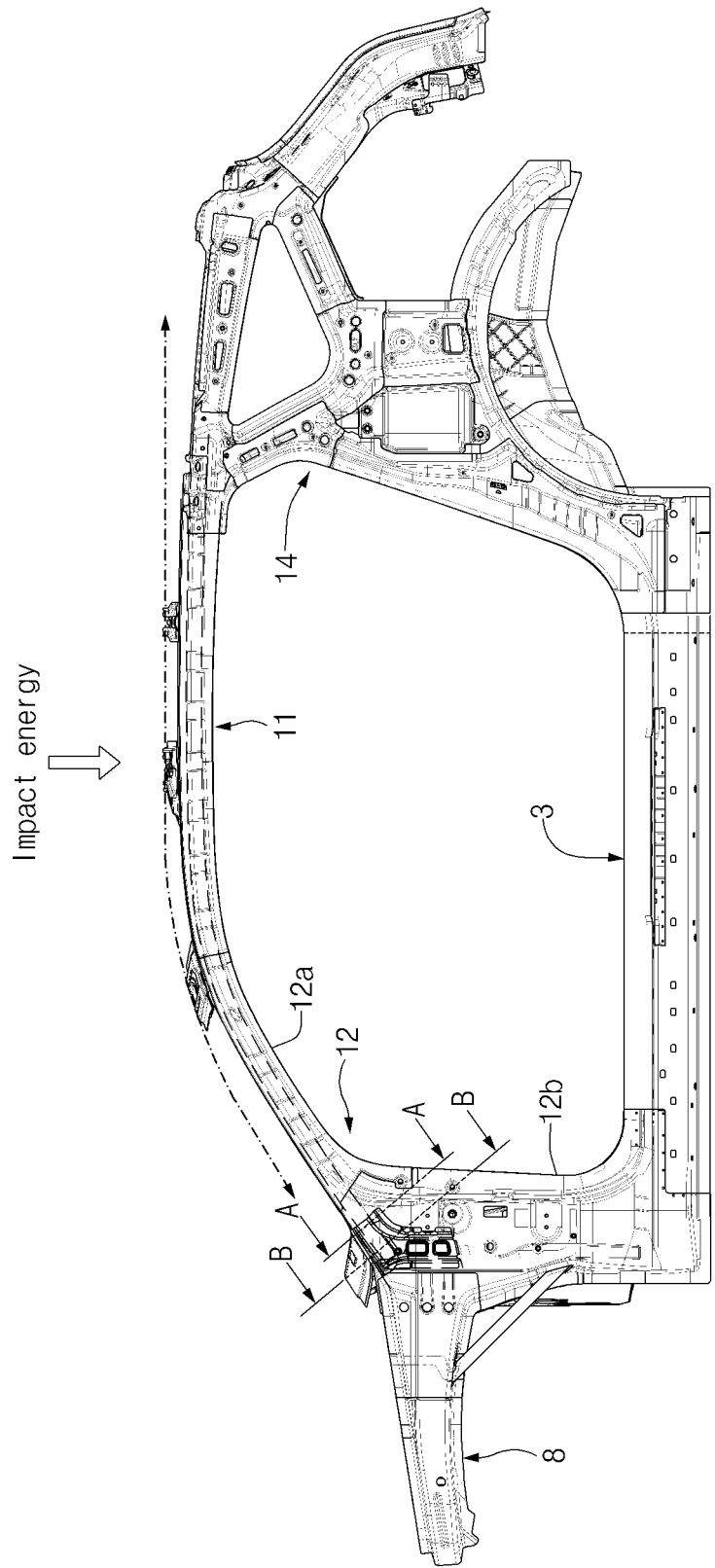
FIG. 1 illustrates a side view of a state in which a roof side rail and a front pillar are connected in a vehicle body structure according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present disclosure relate to a vehicle body structure, and more particularly, to a vehicle body structure improving strength and stiffness of a vehicle body.

Figure 2:
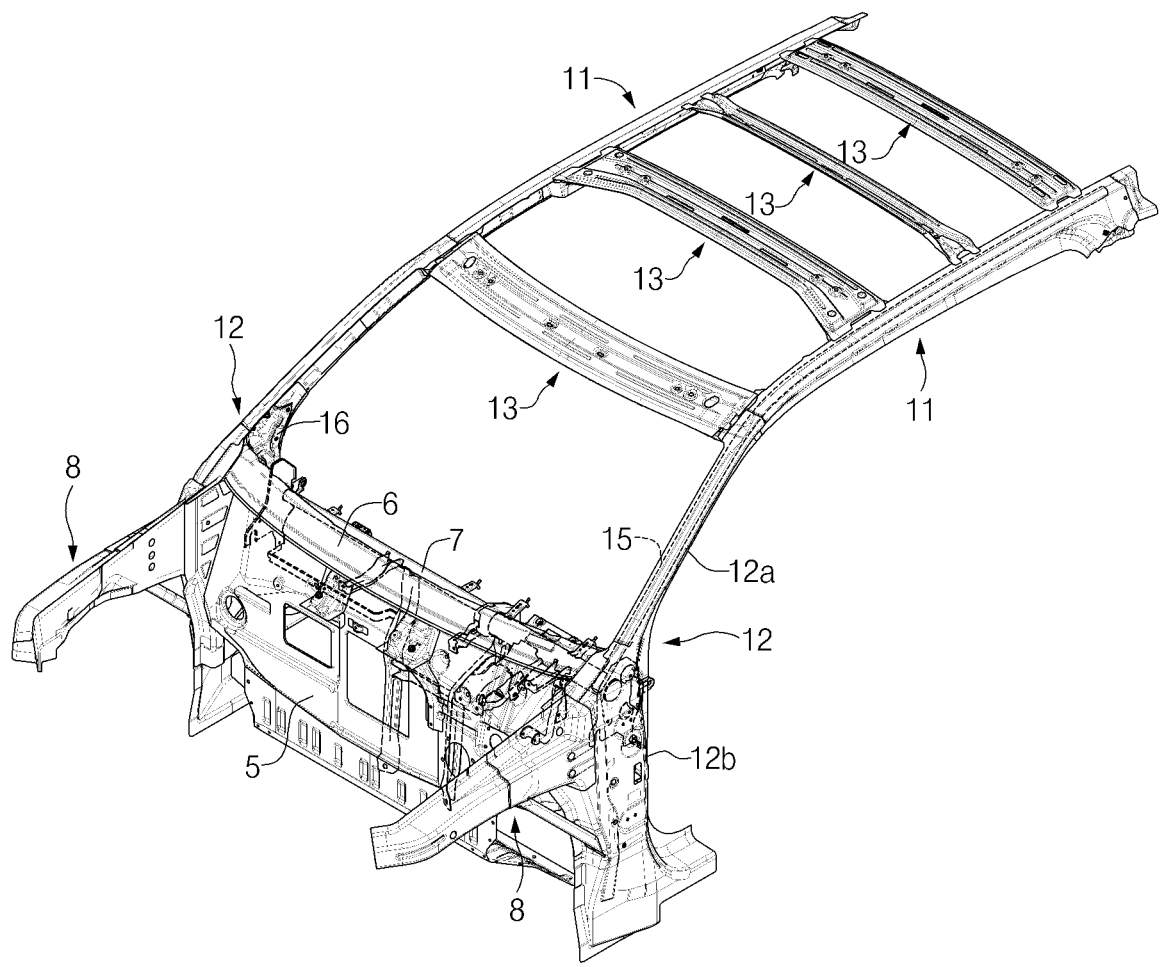
FIG. 2 illustrates a perspective view of a state in which a roof side rail and a front pillar are connected in a vehicle body structure according to an exemplary embodiment of the present disclosure.

Referring to FIGS. 1 and 2, a vehicle body structure according to an exemplary embodiment of the present disclosure may include a roof side rail 11, a front pillar 12 connected to the front of the roof side rail 11, a rear pillar 14 connected to the rear of the roof side rail 11, and a side sill 3 connecting a lower portion of the front pillar 12 and a lower portion of the rear pillar 14.

Referring to FIG. 2, the pair of roof side rails 11 may extend along opposed edges of a roof structure of the vehicle, respectively. Each roof side rail n may extend in a longitudinal direction of the vehicle, and the pair of roof side rails 11 may be spaced apart from each other in a width direction of the vehicle. A plurality of roof crossmembers 13 may connect the pair of roof side rails 11. The pair of roof side rails 11 and the plurality of roof crossmembers 13 may support a roof panel (not shown), a sun roof (not shown), and the like. Each roof side rail n may include a roof side rail inner facing the interior of the vehicle, and a roof side rail outer facing the exterior of the vehicle. The roof side rail 11 may have an inner cavity defined by the roof side rail inner and the roof side rail outer.

Referring to FIGS. 1 and 2, the pair of front pillars 12 may be connected to the pair of roof side rails 11, respectively. A top end portion of the front pillar 12 may be connected to a front end portion of the corresponding roof side rail 11. A pair of fender apron members 8 may be connected to the pair of front pillars 12, respectively. Each fender apron member 8 may extend in the longitudinal direction of the vehicle, and the fender apron member 8 may extend from the corresponding front pillar 12 toward the front of the vehicle.

Referring to FIG. 1, the front pillar 12 may include an upper portion 12a connected to the roof side rail 11, and a lower portion 12b connected to the side sill 3. A top end of the lower portion 12b may be connected to a bottom end of the upper portion 12a.

Figure 3:
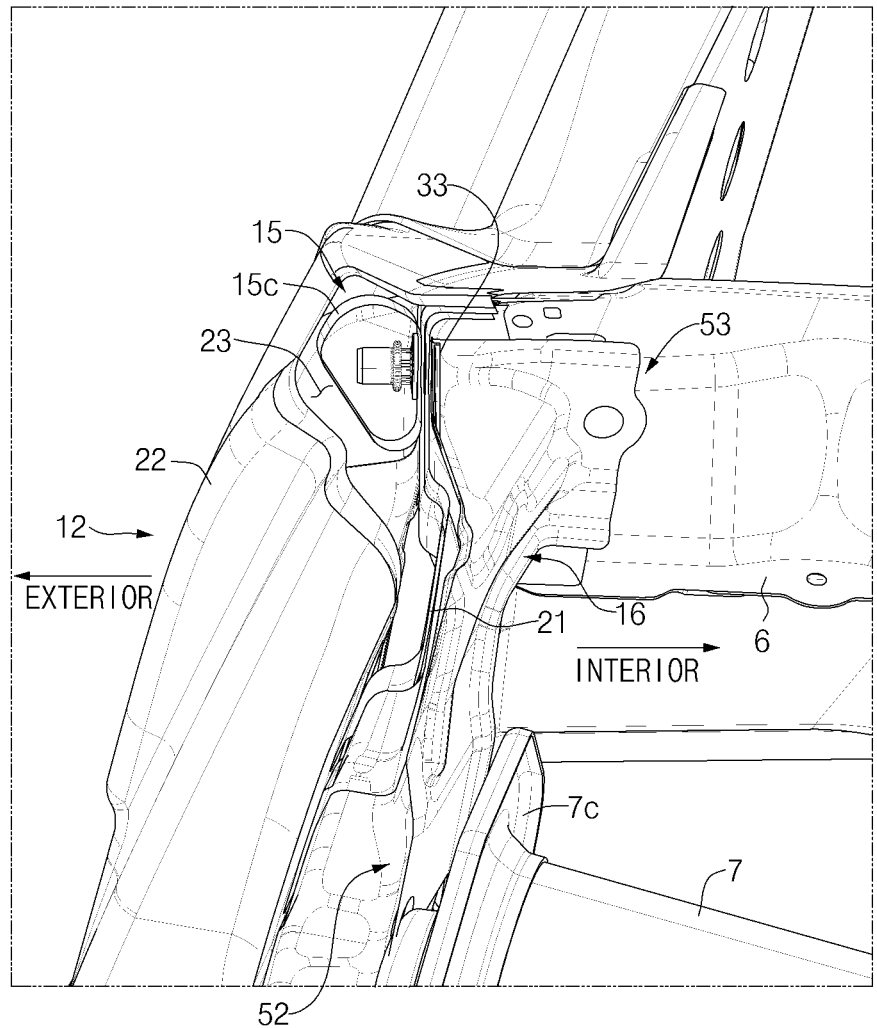
FIG. 3 illustrates a cross-sectional view, taken along line A-A of FIG. 1.
Figure 4:
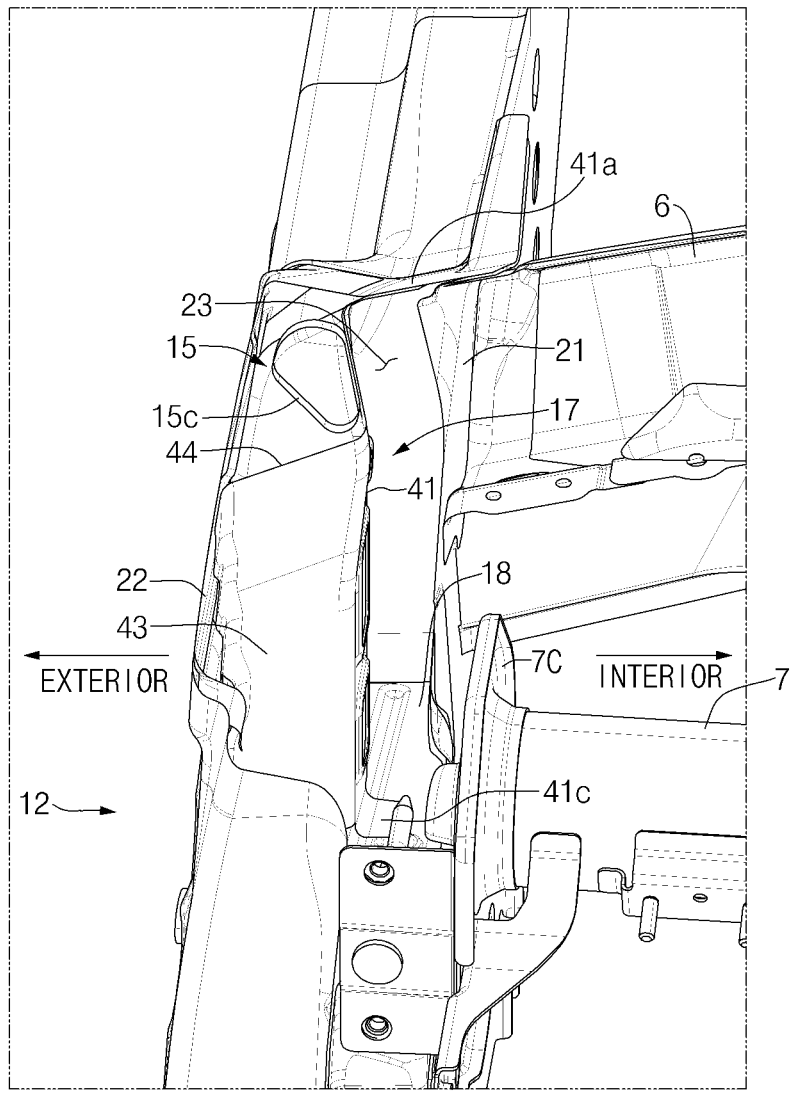
FIG. 4 illustrates a cross-sectional view, taken along line B-B of FIG. 1.

Referring to FIGS. 3 and 4, the front pillar 12 may include a front pillar inner 21 facing the interior of the vehicle, and a front pillar outer 22 facing the exterior of the vehicle. The front pillar inner 21 and the front pillar outer 22 may form a closed cross section, and the front pillar 12 may have an inner cavity 23 defined by the front pillar inner 21 and the front pillar outer 22. The front pillar inner 21 may have an inboard-side surface facing the interior of the vehicle, and an outboard-side surface facing the exterior of the vehicle. The front pillar outer 22 may have an inboard-side surface facing the interior of the vehicle, and an outboard-side surface facing the exterior of the vehicle. The outboard-side surface of the front pillar inner 21 may face the inboard-side surface of the front pillar outer 22 through the inner cavity 23.

Referring to FIG. 1, the vehicle body structure according to an exemplary embodiment of the present disclosure may include a roof side reinforcement 15 extending from the roof side rail 11 to the upper portion 12a of the front pillar 12. The roof side reinforcement 15 (see a dotted line of FIG. 1) may extend along the roof side rail 11 and the upper portion 12a of the front pillar 12. The upper portion 12a of the front pillar 12 may be curved to connect the roof side rail 11 and the lower portion 12b of the front pillar 12, and an end portion 15c of the roof side reinforcement 15 may be curved along the upper portion 12a of the front pillar 12. The roof side reinforcement 15 may be received in the inner cavity of the roof side rail 11 and the inner cavity 23 of the front pillar 12. In particular, the roof side reinforcement 15 may be fixed to the roof side rail 11 and the front pillar 12 using fasteners, welding, and/or the like.

Figure 8:
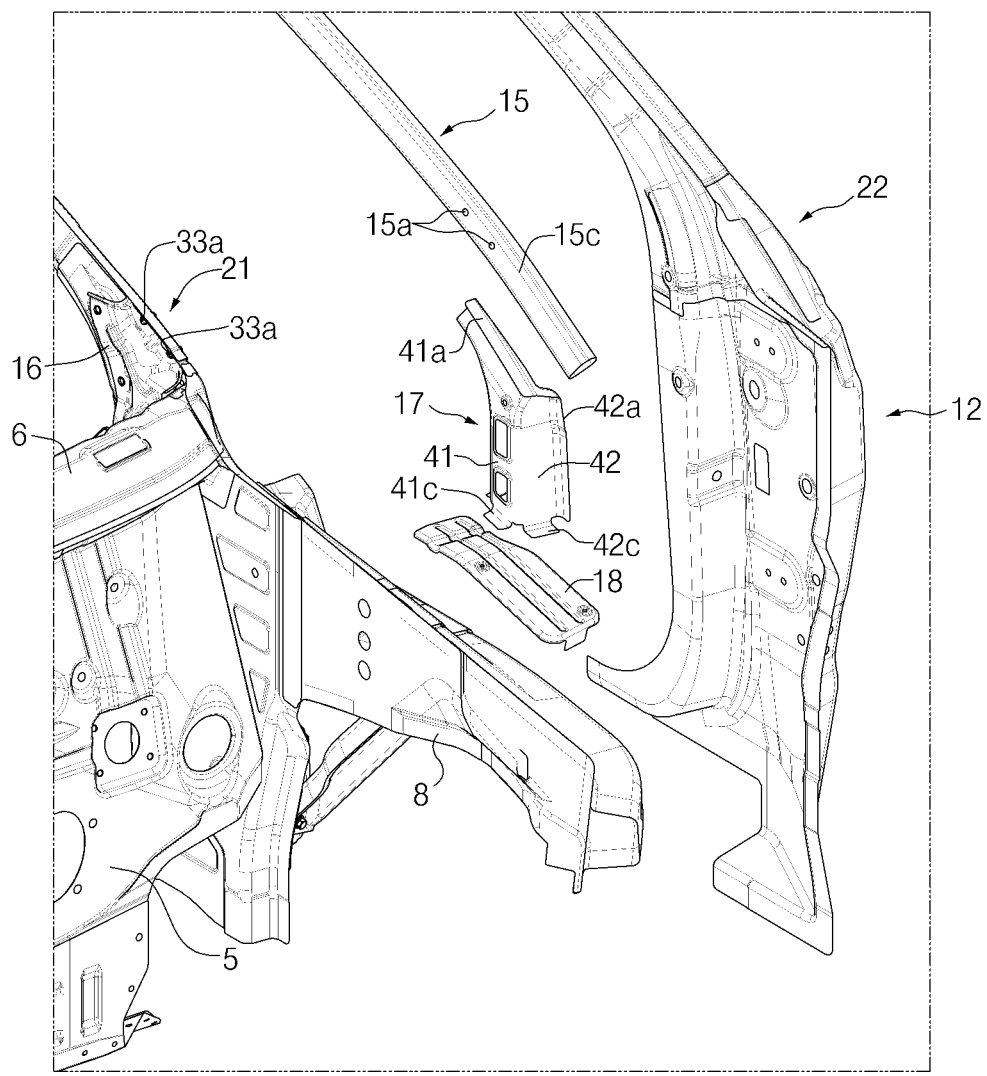
FIG. 8 illustrates an exploded perspective view of a front pillar inner, a front pillar outer, a roof side reinforcement, and an extension bracket in a vehicle body structure according to an exemplary embodiment of the present disclosure.

The end portion 15c of the roof side reinforcement 15 may have a plurality of mounting holes 15a (see FIG. 8). Fasteners may be fastened to the mounting holes 15a so that the end portion 15c of the roof side reinforcement 15 may be fixed to the front pillar inner 21.

Referring to FIG. 2, the vehicle body structure according to an exemplary embodiment of the present disclosure may include a dash panel 5, a cowl member 6, and a cowl cross bar 7, which are disposed between the pair of front pillars 12.

The dash panel 5 may be configured to divide a front compartment from a passenger compartment of the vehicle. The front compartment may be located in front of the dash panel 5, and a powertrain, transmission, and the like may be disposed in the front compartment. The passenger compartment may be located behind the dash panel 5, and vehicle seats, various convenience apparatuses, and the like may be disposed in the passenger compartment.

The cowl member 6 may be disposed on a top edge of the dash panel 5, and the cowl member 6 may be located between the passenger compartment and the front compartment. The cowl member 6 may extend along the top edge of the dash panel 5 in the width direction of the vehicle. The cowl member 6 may cover a gap between a front windshield and a hood. Each end portion 6c of the cowl member 6 may be connected to the corresponding front pillar 12. That is, the cowl member 6 may connect the pair of front pillars 12 in the width direction of the vehicle. The end portion 6c of the cowl member 6 may be fixed to the upper portion of the corresponding front pillar 12 using fasteners, welding, and/or the like.

The cowl cross bar 7 may support a steering wheel, an airbag, and an HVAC casing using various brackets. The cowl cross bar 7 may extend in the width direction of the vehicle, and be located below the cowl member 6. In particular, a longitudinal axis of the cowl cross bar 7 may be parallel to a longitudinal axis of the cowl member 6.

The cowl cross bar 7 may have a pair of mounting walls 7c provided on opposed end portions thereof, respectively. Each mounting wall 7c may match the inboard-side surface of the front pillar inner 21 of the front pillar 12, and accordingly the mounting wall 7c of the cowl cross bar 7 may be firmly mounted on the inboard-side surface of the corresponding front pillar inner 21. According to an exemplary embodiment, each mounting wall 7c may be a flat wall perpendicular to the longitudinal axis of the cowl cross bar 7.

The dash panel 5, the cowl member 6, and the cowl cross bar 7 together with the pair of front pillars 12 may form a rear wall of the front compartment of the vehicle. The front pillar 12 may connect the corresponding roof side rail 11, the cowl member 6, and the cowl cross bar 7. An impact load applied to the roof side rail 11 may be transferred through the front pillar 12, the cowl member 6, and the cowl cross bar 7.

The vehicle body structure according to an exemplary embodiment of the present disclosure may include a connection bracket 16 connecting the front pillar 12, the cowl member 6, and the cowl cross bar 7. Accordingly, the connection bracket 16 may define a plurality of load paths between the front pillar 12, the cowl member 6, and the cowl cross bar 7.

Figure 5:
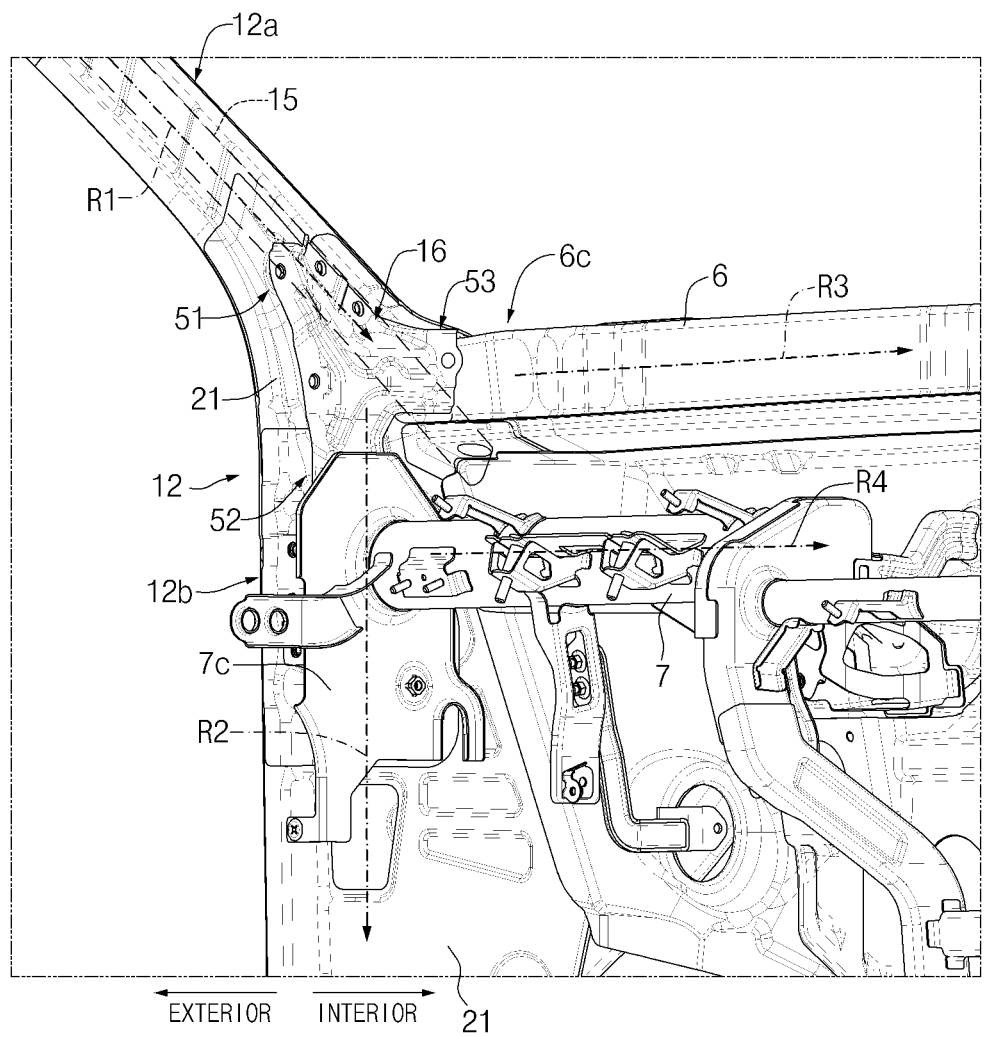
FIG. 5 illustrates a state in which a front pillar, a cowl member, and a cowl cross bar are connected through a connection bracket in a vehicle body structure according to an exemplary embodiment of the present disclosure.

Referring to FIG. 5, the roof side reinforcement 15 may be connected to the front pillar 12, the cowl member 6, and the cowl cross bar 7 through the connection bracket 16. That is, the connection bracket 16 may be configured to connect the roof side reinforcement 15, the front pillar 12, the cowl member 6, and the cowl cross bar 7.

Figure 6:
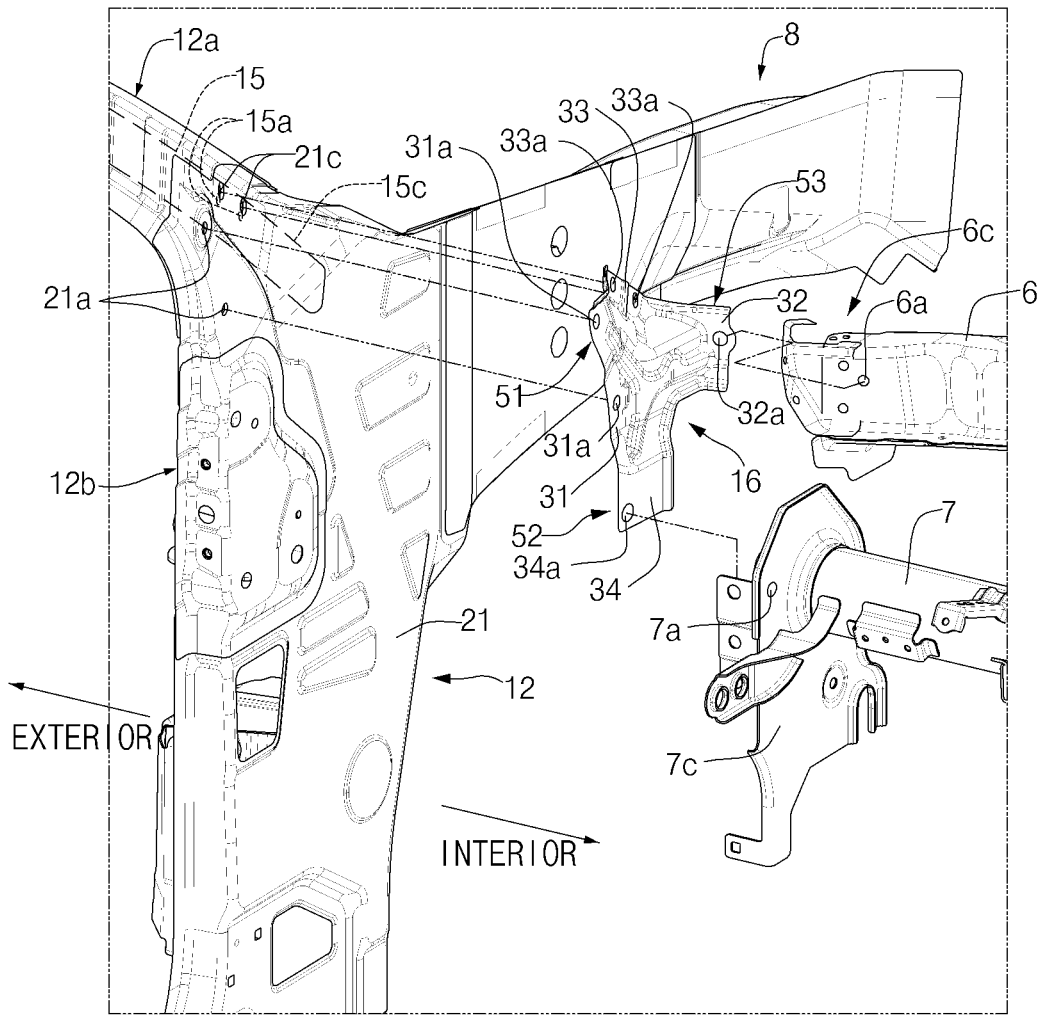
FIG. 6 illustrates an exploded perspective view of a cowl member, a cowl cross bar, and a connection bracket which are separated from a front pillar in a vehicle body structure according to an exemplary embodiment of the present disclosure.

Referring to FIGS. 5 and 6, the connection bracket 16 may be a three-way bracket having three extension portions 51, 52, and 53 extending toward the upper portion 12a of the front pillar 12, the lower portion 12b of the front pillar 12, and the cowl member 6, respectively. Specifically, the connection bracket 16 may have a first extension portion 51 extending toward the upper portion 12a of the front pillar 12, a second extension portion 52 extending toward the lower portion 12b of the front pillar 12, and a third extension portion 53 extending toward the cowl member 6. An angle between the first extension portion 51 and the second extension portion 52 may correspond to an angle between the upper portion 12a of the front pillar 12 and the lower portion 12b, of the front pillar 12. The third extension portion 53 may extend from the first extension portion 51 and the second extension portion 52 toward the interior of the vehicle.

The connection bracket 16 may be fixed to the inboard-side surface of the front pillar inner 21 using fasteners, welding, and/or the like. Referring to FIG. 6, the connection bracket 16 may include a mounting wall 31 provided on a front portion of the connection bracket 16, a rear flange 32 provided on a rear portion of the connection bracket 16, a top flange 33 provided on a top end portion of the connection bracket 16, and a bottom flange 34 provided on a bottom end portion of the connection bracket 16.

The mounting wall 31 may extend along the front of the first extension portion 51 and the front of the second extension portion 52, and the mounting wall 31 may be mounted on the inboard-side surface of the front pillar inner 21 of the front pillar 12 using fasteners, welding, and/or the like. Referring to FIG. 6, the mounting wall 31 may have a plurality of mounting holes 31a, and the mounting holes 31a may be aligned with mounting holes 21a of the corresponding front pillar inner 21, respectively. A fastener such as a bolt may be fastened to the mounting hole 31a of the mounting wall 31 and the mounting hole 21a of the front pillar inner 21 so that the mounting wall 31 may be directly fixed to the inboard-side surface of the front pillar inner 21.

The rear flange 32 may be provided on a rear end of the third extension portion 53, and the rear flange 32 may be connected to the end portion 6c of the cowl member 6 using fasteners, welding, and/or the like. Referring to FIG. 6, the rear flange 32 may have at least one mounting hole 32a, and the mounting hole 32a may be aligned with a mounting hole 6a provided in the end portion 6c of the cowl member 6. A fastener such as a bolt may be fastened to the mounting hole 32a of the rear flange 32 and the mounting hole 6a of the cowl member 6 so that the rear flange 32 may be directly fixed to the end portion 6c of the cowl member 6.

The top flange 33 may be provided on a top edge of the first extension portion 51, and the top flange 33 may be connected to the front pillar inner 21 and the roof side reinforcement 15 using fasteners, welding, and/or the like. Referring to FIG. 6, the top flange 33 may have a plurality of mounting holes 33a. The mounting holes 33a may be aligned with mounting holes 21c of the corresponding front pillar inner 21 and the mounting holes 15a of the roof side reinforcement 15, respectively. A fastener such as a bolt may be fastened to the mounting hole 33a of the top flange 33, the mounting hole 21c of the front pillar inner 21, and the mounting hole 15a of the roof side reinforcement 15 so that the top flange 33 and the end portion 15c of the roof side reinforcement 15 may be fixed together to the front pillar inner 21. Referring to FIG. 3, the end portion 15c of the roof side reinforcement 15 received in the inner cavity 23 of the front pillar 12 may be attached to the outboard-side surface of the front pillar inner 21, and the connection bracket 16 may be attached to the inboard-side surface of the front pillar inner 21 so that a portion of the front pillar inner 21 may be sandwiched between the end portion 15c of the roof side reinforcement 15 and the connection bracket 16. Accordingly, stiffness of the front pillar inner 21 may be increased, and mounting stiffness of the end portion 15c of the roof side reinforcement 15 and connection stiffness between the roof side reinforcement 15 and the connection bracket 16 may be increased.

The bottom flange 34 may be provided on a bottom edge of the second extension portion 52, and the bottom flange 34 may be fixed to the mounting wall 7c of the cowl cross bar 7 using fasteners, welding, and/or the like. Referring to FIG. 6, the bottom flange 34 may have at least one mounting hole 34a, and the mounting hole 34a may be aligned with a mounting hole 7a of the corresponding mounting wall 7c of the cowl cross bar 7. A fastener such as a bolt may be fastened to the mounting hole 34a of the bottom flange 34 and the mounting hole 7a of the mounting wall 7c of the cowl cross bar 7 so that the bottom flange 34 may be fixed to the mounting wall 7c of the cowl cross bar 7.

The top flange 33 of the connection bracket 16 may be connected to the end portion 15c of the roof side reinforcement 15 through the front pillar inner 21, the rear flange 32 of the connection bracket 16 may be connected to the cowl member 6, and the bottom flange 34 of the connection bracket 16 may be connected to the cowl cross bar 7 so that the end portion 15c of the roof side reinforcement 15, the front pillar inner 21 of the front pillar 12, the cowl member 6, and the cowl cross bar 7 may be connected in three directions through the connection bracket 16. Referring to FIG. 5, the roof side reinforcement 15, the connection bracket 16, the front pillar 12, the cowl member 6, and the cowl cross bar 7 may define a plurality of load paths R1, R2, R3, and R4. The plurality of load paths may include a first load path R1 defined along a longitudinal axis of the roof side reinforcement 15, a second load path R2 defined along a longitudinal axis of the front pillar 12, a third load path R3 defined along the longitudinal axis of the cowl member 6, and a fourth load path R4 defined along the longitudinal axis of the cowl cross bar 7. A load applied to a portion of the vehicle body may be distributed and transferred in various directions from the front pillar 12 through the load paths R1, R2, R3, and R4 so that the load may be significantly reduced or may be prevented from being concentrated on the portion of the vehicle body. Thus, strength and stiffness of the vehicle body may be improved.

For example, in the event of a vehicle rollover accident, an impact load applied to a roof may be distributed and transferred through the roof side reinforcement 15, the front pillar 12, the cowl member 6, and the cowl cross bar 7, and accordingly the impact load may be prevented from being directly transferred to the passenger compartment of the vehicle through the roof. Thus, roof strength of the vehicle may be improved. In particular, the impact load applied to the roof may be distributed and transferred in various directions including in a height direction of the vehicle through the front pillar 12 and in the width direction of the vehicle through the cowl member 6 and the cowl cross bar 7. Since there is no need to increase a cross-sectional area of the front pillar 12 and a thickness of the front pillar inner 21 and/or a thickness of the front pillar outer 22, the weight and manufacturing cost of the front pillar 12 may be reduced, and the interior package layout may not be degraded.

Referring to FIGS. 4, 7, 8, and 10, the vehicle body structure according to an exemplary embodiment of the present disclosure may include an extension bracket 17 connecting the front pillar 12 and the fender apron member 8. In particular, the extension bracket 17 may be received in the inner cavity 23 of the front pillar 12, and may be connected to the end portion 15c of the roof side reinforcement 15 using fasteners, welding, and/or the like. The extension bracket 17 may extend from the roof side reinforcement 15 to the fender apron member 8, and accordingly the extension bracket 17 may transfer a load applied to the roof side reinforcement 15 and the front pillar 12 to the fender apron member 8.

Figure 7:
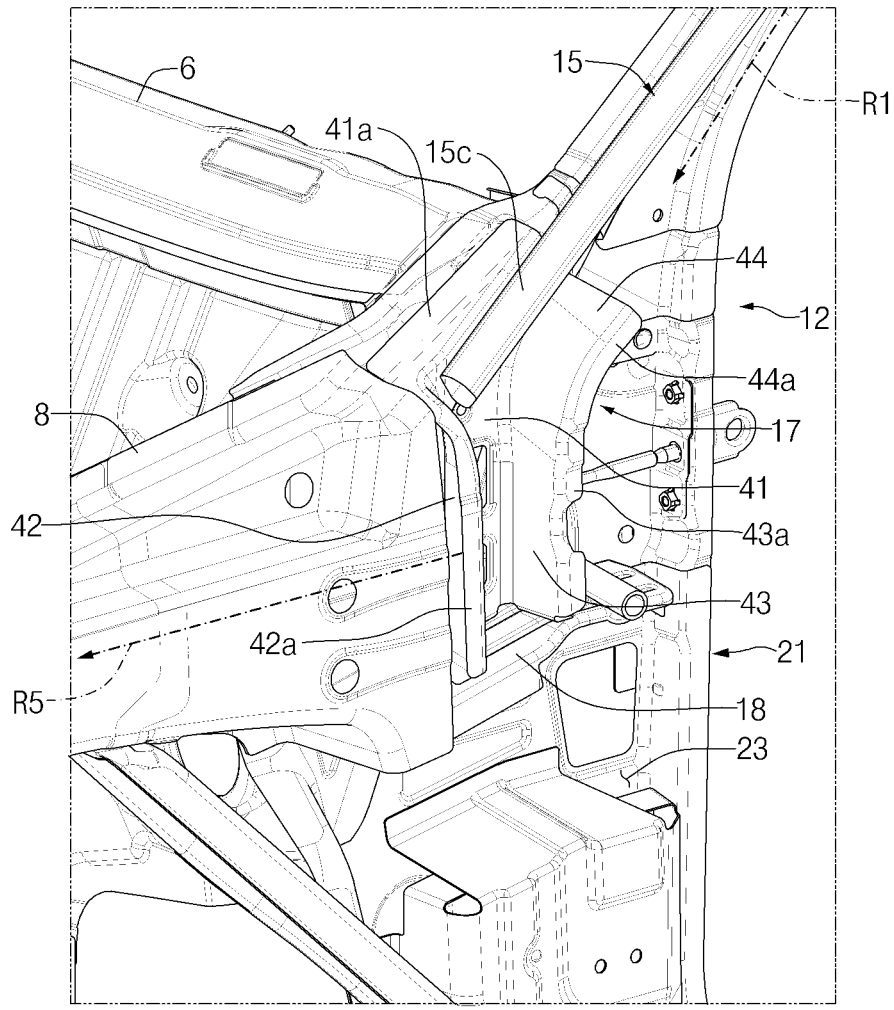
FIG. 7 illustrates a state in which an extension bracket connects an end portion of a roof side reinforcement and a fender apron member in a vehicle body structure according to an exemplary embodiment of the present disclosure.

Referring to FIGS. 7 and 8, the extension bracket 17 may be received in the inner cavity 23 of the front pillar 12, and the extension bracket 17 may extend from the end portion 15c of the roof side reinforcement 15 toward the fender apron member 8. The end portion 15c of the roof side reinforcement 15 may be fixed to the extension bracket 17 using fasteners, welding, and/or the like, and the extension bracket 17 may be directly connected to the corresponding fender apron member 8 or be indirectly connected to the corresponding fender apron member 8 through a support 18 and the like. The support 18 may be received in the inner cavity 23 of the front pillar 12, and the support 18 may be located below the extension bracket 17. The support 18 may be fixed to the front pillar inner 21 and/or the front pillar outer 22 of the front pillar 12 using fasteners, welding, and/or the like. A front end of the support 18 may be fixed to the fender apron member 8 using fasteners, welding, and/or the like. As the extension bracket 17 is mounted on the support 18, the extension bracket 17 may be connected to the fender apron member 8 through the support 18.

Figure 9:
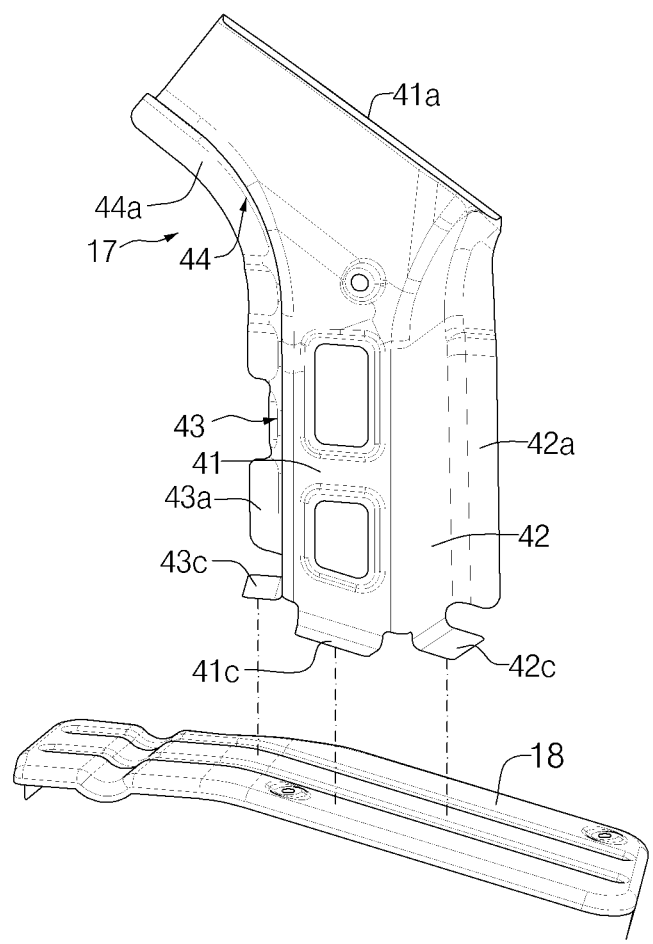
FIG. 9 illustrates an extension bracket and a support in a vehicle body structure according to an exemplary embodiment of the present disclosure.
Figure 10:
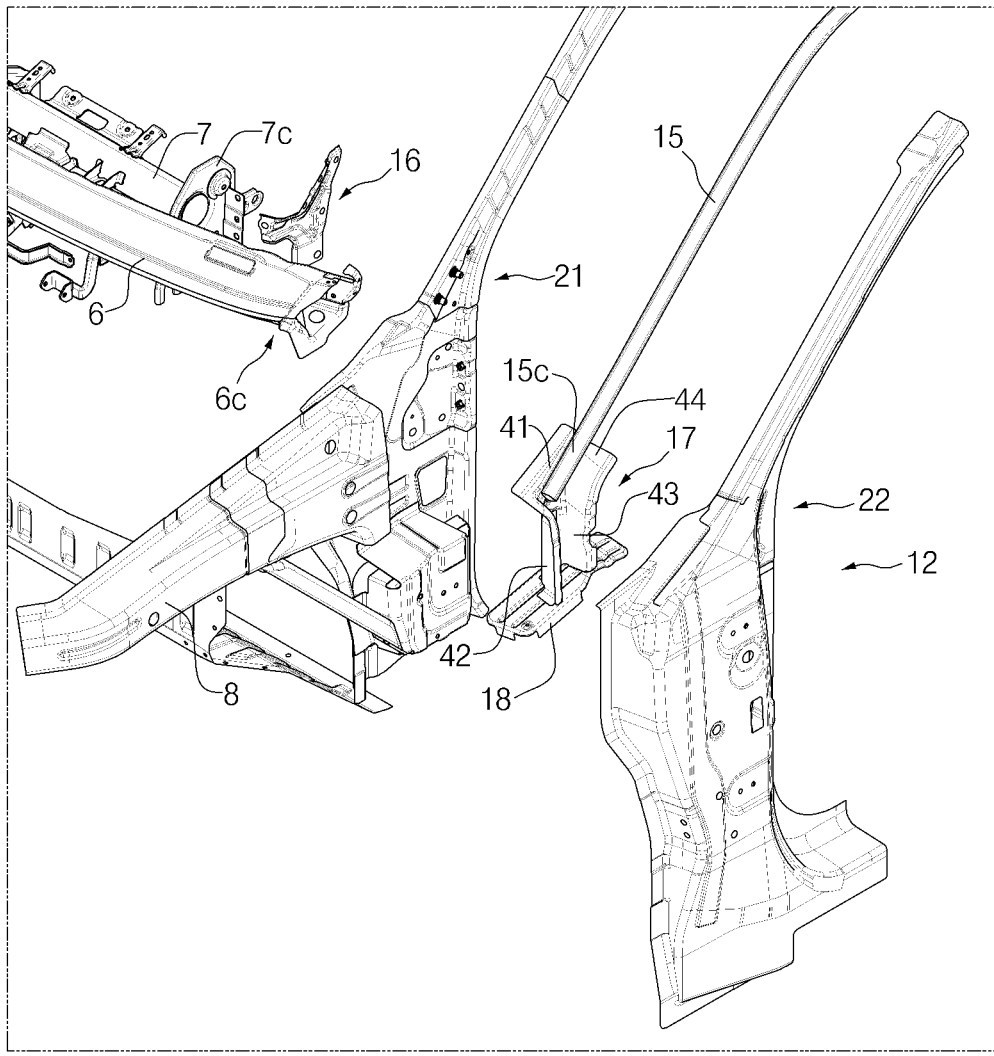
FIG. 10 illustrates an exploded perspective view of a cowl member, a cowl cross bar, a connection bracket, a front pillar inner, a front pillar outer, a roof side reinforcement, and an extension bracket in a vehicle body structure according to an exemplary embodiment of the present disclosure.

Referring to FIG. 9, the extension bracket 17 may include an inboard wall 41 facing the interior of the vehicle, a front wall 42 facing the front of the vehicle, a rear wall 43 facing the rear of the vehicle, and a rear extension wall 44 extending from the rear wall 43 toward the rear of the vehicle.

The inboard wall 41 may have a top flange 41a provided on a top end thereof and a bottom flange 41c provided on a bottom end thereof. Referring to FIG. 9, the bottom flange 41c may be fixed to the support 18 using fasteners, welding, and/or the like.

The front wall 42 may have an outboard flange 42a facing the exterior of the vehicle, and a bottom flange 42c provided on a bottom end thereof. The outboard flange 42a may be fixed to the front pillar outer 22 using fasteners, welding, and/or the like. Referring to FIG. 9, the bottom flange 42c may be fixed to the support 18 using fasteners, welding, and/or the like.

According to an exemplary embodiment, a top end portion of the front wall 42 may be directly connected to the fender apron member 8 by welding. That is, a portion of the extension bracket 17 may be directly connected to the fender apron member 8, and a load applied to the extension bracket 17 may be transferred to the fender apron member 8.

The rear wall 43 may have an outboard flange 43a facing the exterior of the vehicle, and a bottom flange 43c provided on a bottom end thereof. The outboard flange 43a may be fixed to the front pillar outer 22 using fasteners, welding, and/or the like. Referring to FIG. 9, the bottom flange 43c may be fixed to the support 18 using fasteners, welding, and/or the like.

The rear extension wall 44 may have an outboard flange 44a facing the exterior of the vehicle. The outboard flange 44a may be fixed to the front pillar outer 22 using fasteners, welding, and/or the like. The rear extension wall 44 may extend obliquely to match the curved end portion 15c of the roof side reinforcement 15 so that the rear extension wall 44 may firmly support the curved end portion 15c of the roof side reinforcement 15.

The end portion 15c of the roof side reinforcement 15 may be received in a cavity defined by the inboard wall 41, the front wall 42, and the rear extension wall 44 of the extension bracket 17. As described above, the end portion 15c of the roof side reinforcement 15 may be fixed to the inboard wall 41 of the extension bracket 17 using fasteners, welding, and/or the like.

Referring to FIG. 7, the roof side reinforcement 15 may be connected to the fender apron member 8 through the extension bracket 17 so that a load path R5 may be defined along the extension bracket 17 and a longitudinal axis of the fender apron member 8. A load applied to the roof side reinforcement 15 may be transferred through the extension bracket 17 and the fender apron member 8, and accordingly the load may be distributed and transferred from the front pillar 12 toward the front of the vehicle through the fender apron member 8 in the longitudinal direction of the vehicle.

For example, in the event of a vehicle rollover accident, an impact load applied to the roof may be distributed and transferred through the roof side reinforcement 15, the front pillar 12, and the fender apron member 8, and accordingly the impact load may be prevented from being directly transferred to the passenger compartment of the vehicle through the roof. Thus, the roof strength of the vehicle may be improved. In particular, the impact load applied to the roof may be distributed and transferred in various directions including in the height direction of the vehicle through the front pillar 12 and in the longitudinal direction of the vehicle through the fender apron member 8. Since there is no need to increase the cross-sectional area of the front pillar 12 and the thickness of the front pillar inner 21 and/or the thickness of the front pillar outer 22, the weight and manufacturing cost of the front pillar 12 may be reduced, and the interior package layout may not be degraded.

As set forth above, the vehicle body structure according to exemplary embodiments of the present disclosure may be configured to distribute and transfer a load applied to a portion (e.g., the roof) of the vehicle body in various directions from the front pillar, thereby significantly improving the strength and stiffness of the vehicle body. In particular, by minimizing the load or preventing the load from being concentrated on the front pillar, there is no need to increase the cross-sectional area and thickness of the front pillar, and accordingly the weight and manufacturing cost of the front pillar may be reduced. For example, in the event of a vehicle rollover accident, the impact load applied to the roof may be distributed and transferred through the front pillar and various structural members connected thereto so that the impact load may be prevented from being directly transferred to the passenger compartment through the roof. Thus, the roof strength of the vehicle may be improved.

According to exemplary embodiments of the present disclosure, the front pillar and various structural members may be connected through the connection bracket and/or the extension bracket to provide the plurality of load paths in various directions, thereby distributing and transferring the load applied to various parts of the vehicle body in various directions.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle body structure, comprising:
 a roof side rail;
 a front pillar connected to the roof side rail;
 a cowl member connected to the front pillar, and extending in a width direction of a vehicle;
 a cowl cross bar located below the cowl member, connected to the front pillar, and extending in the width direction of the vehicle; and
 a connection bracket connecting the front pillar, the cowl member, and the cowl cross bar,
 wherein the connection bracket is a three-way bracket having a first extension portion extending toward an upper portion of the front pillar, a second extension portion extending toward a lower portion of the front pillar, and a third extension portion extending toward the cowl member.

2. The vehicle body structure according to claim 1, wherein the connection bracket is fixed to an inboard-side surface of the front pillar, and
 the cowl member and the cowl cross bar are directly connected to the connection bracket.

3. The vehicle body structure according to claim 1, wherein the connection bracket includes a mounting wall fixed to an inboard-side surface of the front pillar, a side flange fixed to an end portion of the cowl member, and a bottom flange fixed to an end portion of the cowl cross bar.

4. The vehicle body structure according to claim 3, wherein:
 the mounting wall is disposed on a rear portion of the connection bracket, and
 the mounting wall is fixed to the inboard-side surface of the front pillar through a fastener.

5. The vehicle body structure according to claim 3, wherein:
 the side flange is disposed on a front portion of the connection bracket, and
 the side flange is fixed to the end portion of the cowl member through a fastener.

6. The vehicle body structure according to claim 3, wherein the bottom flange is disposed on a bottom end portion of the connection bracket, and
 the bottom flange is fixed to the end portion of the cowl cross bar through a fastener.

7. The vehicle body structure according to claim 1, further comprising a roof side reinforcement extending from the roof side rail to an inner cavity of the front pillar,
 wherein the roof side reinforcement is connected to the front pillar, the cowl member, and the cowl cross bar through the connection bracket.

8. The vehicle body structure according to claim 7, wherein:
 the connection bracket further includes a top flange connected to the roof side reinforcement, and
 a portion of the front pillar is sandwiched between the top flange and the roof side reinforcement.

9. The vehicle body structure according to claim 8, wherein:
 the top flange is disposed on a top end portion of the connection bracket, and
 the top flange is fixed to the front pillar and the roof side reinforcement through a fastener.

10. A vehicle body structure, comprising:
 a roof side rail;
 a front pillar connected to the roof side rail;
 a fender apron member extending from the front pillar toward a front of a vehicle; and
 an extension bracket received in an inner cavity of the front pillar, and connecting the front pillar and the fender apron member.

11. The vehicle body structure according to claim 10, further comprising a roof side reinforcement extending from the roof side rail to the inner cavity of the front pillar, wherein
 an end portion of the roof side reinforcement is located in the inner cavity of the front pillar, and
 the end portion of the roof side reinforcement is connected to the fender apron member through the extension bracket.

12. The vehicle body structure according to claim 11, further comprising a support received in the inner cavity of the front pillar, and fixed to the front pillar, wherein
 the support is located below the extension bracket,
 the support is directly connected to the fender apron member, and
 the extension bracket is fixed to the support.

13. The vehicle body structure according to claim 12, wherein the extension bracket includes:
 an inboard wall facing an interior of the vehicle,
 a front wall facing the front of the vehicle, a rear wall facing a rear of the vehicle, and
 a rear extension wall extending from the rear wall toward the rear of the vehicle.

14. The vehicle body structure according to claim 13, wherein:
 the inboard wall has a bottom flange disposed on a bottom end thereof, and
 the bottom flange is fixed to the support.

15. The vehicle body structure according to claim 13, wherein:
 the front wall has a bottom flange disposed on a bottom end thereof, and
 the bottom flange is fixed to the support.

16. The vehicle body structure according to claim 13, wherein
 the rear wall has a bottom flange disposed on a bottom end thereof, and
 the bottom flange is fixed to the support.

17. The vehicle body structure according to claim 13, wherein the rear extension wall supports the end portion of the roof side reinforcement.

18. A vehicle comprising:
 a body structure, wherein the body structure comprises:
  a roof side rail,
  a front pillar connected to the roof side rail,
  a fender apron member extending from the front pillar toward a front of the vehicle, and
  an extension bracket received in an inner cavity of the front pillar, and connecting the front pillar and the fender apron member.

19. The vehicle of claim 18, wherein the body structure further comprises a roof side reinforcement extending from the roof side rail to the inner cavity of the front pillar, wherein
 an end portion of the roof side reinforcement is located in the inner cavity of the front pillar, and the end portion of the roof side reinforcement is connected to the fender apron member through the extension bracket.

20. The vehicle of claim 19, wherein the body structure further comprises a support received in the inner cavity of the front pillar, and fixed to the front pillar, wherein
the support is located below the extension bracket,
the support is directly connected to the fender apron member, and
the extension bracket is fixed to the support.

* * * * *